United States Patent
Suzuki

(10) Patent No.: US 9,720,206 B2
(45) Date of Patent: Aug. 1, 2017

(54) LENS APPARATUS HAVING MAGNIFICATION VARIATOR CONFIGURED TO MOVE DURING MAGNIFICATION VARYING AND IMAGE PICKUP APPARATUS HAVING THE SAME

(71) Applicant: CANON KABUSHIKI KAISHA, Tokyo (JP)

(72) Inventor: Noboru Suzuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/090,735

(22) Filed: Apr. 5, 2016

(65) Prior Publication Data

US 2016/0299315 A1  Oct. 13, 2016

(30) Foreign Application Priority Data

Apr. 10, 2015 (JP) ................. 2015-081284

(51) Int. Cl.
*H04N 5/235* (2006.01)
*G02B 7/10* (2006.01)
*H04N 5/232* (2006.01)

(52) U.S. Cl.
CPC ......... *G02B 7/102* (2013.01); *H04N 5/23296* (2013.01)

(58) Field of Classification Search
CPC ... H04N 5/23296; H04N 5/235; H04N 5/2351
See application file for complete search history.

(56) References Cited

U.S. PATENT DOCUMENTS

| 5,438,190 A * | 8/1995 | Kaneda | G02B 7/102 250/201.3 |
| 8,866,935 B2 | 10/2014 | Kagei | |
| 2016/0299314 A1* | 10/2016 | Makita | H04N 5/23296 |

FOREIGN PATENT DOCUMENTS

| JP | 11211962 A | 8/1999 |
| JP | 2013175924 A | 9/2013 |

* cited by examiner

*Primary Examiner* — Tuan Ho
(74) *Attorney, Agent, or Firm* — Rossi, Kimms & McDowell LLP

(57) ABSTRACT

A lens apparatus includes a magnification variator driven for zooming, a drive unit that drives the variator, a detector that detects the position of the variator, a deriving unit that derives a second drive signal to drive the drive unit based on: an information representing relationship between position of the variator and size of field of view; a position detected by the detector; and first drive signal, wherein field-of-view change rate obtained when the drive unit is driven based on the second drive signal is smaller than field-of-view change rate obtained when the drive unit is driven based on the first drive signal, and a corrector that outputs position data in which variation of speed of the variator is smaller than that of position data based on the second drive command, when the variator is driven based on the second drive command derived by the deriving unit.

9 Claims, 5 Drawing Sheets

LENS APPARATUS HAVING MAGNIFICATION VARIATOR CONFIGURED TO MOVE DURING MAGNIFICATION VARYING AND IMAGE PICKUP APPARATUS HAVING THE SAME

BACKGROUND OF THE INVENTION

Field of the Invention

The present invention relates to a lens apparatus and more particularly to a lens apparatus for broadcast and/or cinema use. The present invention also relates to an image pickup apparatus having such a lens apparatus.

Description of the Related Art

In the broadcast and cinema industries, use of processing such as CG compositing and augmented reality (AR) in the virtual studio has been increasing, and the image resolution is shifting from the high vision to 4K and 8K. Moreover, increasing screen sizes require improvements in accuracy of compositing and increases in the processing speed. Some lens apparatuses are adapted to output relative zoom position information as position information of the lens for virtual processing. However, the zoom position information depends on the optical and mechanical design of the lens apparatus and does not take account of the field-of-view change rate. With improvement in the performance and reduction in size and weight, lenses of which the change of the field-of-view change rate with zooming is not simple have been developed.

The relationship between the virtual values output from lenses used for CG compositing or the like and the optical characteristics of the lenses has variations specific to the lenses that result from manufacturing errors of the lenses and flange-back adjustment.

In view of this, in the case where processing such as CG compositing and/or AR processing is to be used, relationship between virtual output information corresponding to the lens position at which compositing is to be performed and the size of an object in the image is measured in advance. In cases where zoom lens position information is displayed in the viewfinder of the camera, the relative position information of the zoom lens is obtained from the lens apparatus and the value thus obtained is displayed. Japanese Patent Application Laid-Open No. H11-211962 discloses a technology of changing the relationship between the focal length and the field-of-view change rate of a zoom lens. Japanese Patent Application Laid-Open No. 2013-175924 discloses a technology of controlling the drive speed taking account of the field-of-view change rate associated with a zoom position command value when presetting the zoom and pan/tilt.

However, systems that perform processing such as CG compositing and/or AR processing using relative zoom position information as a virtual output value suffers from the following problem. If zoom is controlled based on a command with a constant change speed of zoom lens position, the position of the zoom lens is not changed at a constant speed (or at a constant field-of-view change rate) actually, so that the virtual output value is not output at a constant change rate. Another problem that arises in the case where processing such as CG compositing and/or AR processing is to be performed is that preparation for image taking require time, because measurement of relationship between virtual output information corresponding to the lens position at which compositing is to be performed and the size of an object in the image is performed in advance.

Moreover there is another problem that relative zoom lens position information displayed in the viewfinder of the camera is not displayed at a constant change rate, though the zoom lens is driven by a command with a constant zoom speed. Consequently, in the case of a camera apparatus in which relative zoom lens position information is displayed, the change rate of the relative zoom lens position information is not constant. Therefore, even if the operator intends to shift the zoom position at a constant speed, the displayed position information does not change at a constant change rate. Then, there is a possibility that the operator may mistakenly think that he or she is operating the zoom lens in a wrong way.

SUMMARY OF THE INVENTION

A lens apparatus according to the present invention includes: a magnification variator configured to move during magnification varying; a drive unit configured to drive the magnification variator; a detector configured to detect a position of the magnification variator; a deriving unit configured to derive a second drive signal to drive the drive unit based on: an information representing a relationship between a position of the magnification variator and a size of a field of view picked up through the lens apparatus; a position detected by the detector; and a first drive signal, wherein a field-of-view change rate obtained when the drive unit is driven based on the second drive signal is smaller than a field-of-view change rate obtained when the drive unit is driven based on the first drive signal; and a corrector configured to output position data in which a variation of speed of the magnification variator is smaller than that of position data based on the second drive command, when the magnification variator is driven based on the second drive command derived by the deriving unit.

With the lens apparatus according to the present invention, even in a case where the field-of-view change rate is controlled to keep constant when the zoom speed command is constant, the operation done by a photographer (user) and zoom position information output from the lens apparatus is in agreement, eliminating the feeling of disagreement between the operation and the output value and preventing the photographer from mistakenly thinking that he or she is operating the lens apparatus in a wrong way.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
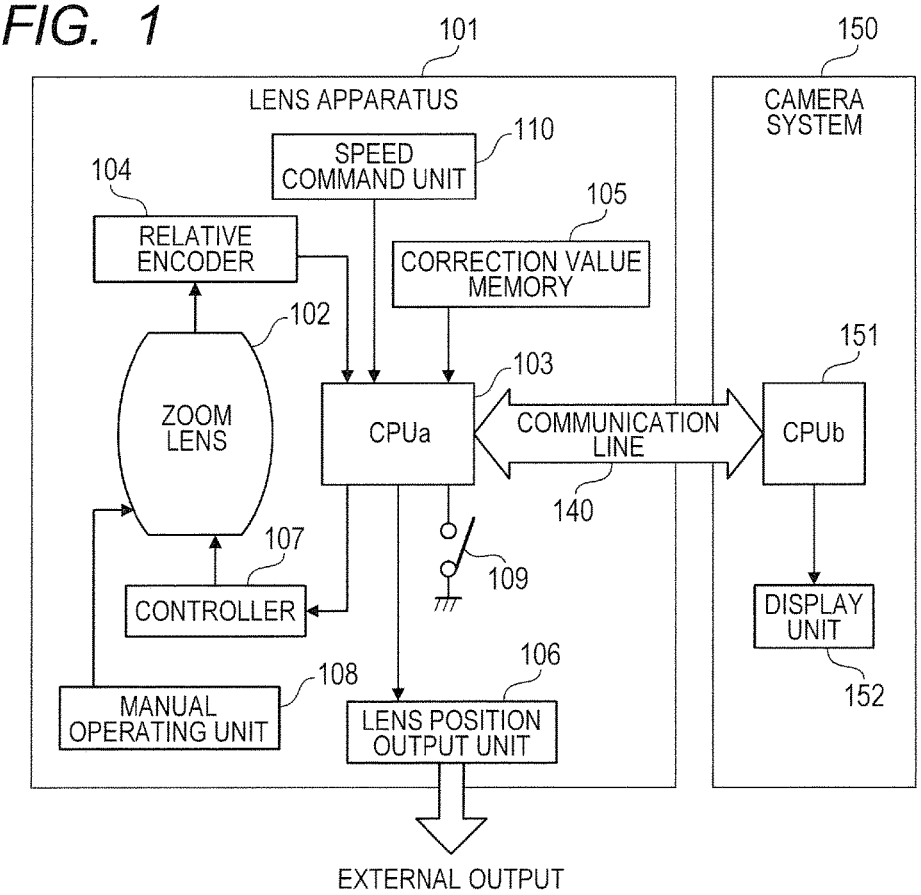
FIG. 1 is a block diagram showing the configuration of a lens apparatus according to the present invention.

An embodiment of the present invention will be described with reference to FIG. 1. FIG. 1 is a block diagram schematically shows the general configuration of a lens apparatus according to the present invention.

The lens apparatus 101 according to the present invention is coupled to a camera apparatus 150 having an image pickup element that receives an optical image formed by the lens apparatus 101. The lens apparatus 101 and the camera apparatus 150 thus coupled constitute an image pickup apparatus that enjoys advantageous effects of the present invention. The lens apparatus 101 has a first CPU 103 that performs information management and overall control of the lens apparatus 101 to which a speed command (or drive command) is input from a speed command unit 110. The first CPU 103 exchanges information with a second CPU 151 in the camera apparatus 150 via communication line 140. The lens apparatus 101 has a zoom lens 102, which is an optical member for varying magnification. Driving of the zoom lens 102 is controlled by a controller 107 on the basis of a control signal supplied by the first CPU 103. A relative encoder (serving as the detector) 104 is connected to the zoom lens 102. The relative encoder 104 measures the relative position of the zoom lens 102, and the output value of the relative encoder 104 is read by the first CPU 103. The first CPU 103 performs feedback control using the output value of the relative encoder 104. Apart from the feedback control by the first CPU 103, the zoom lens 102 also allows manual zooming operation through a manual operating unit 108. The first CPU (serving as the corrector) 103 is provided with a correction value memory (serving as the memory) 105, in which data needed to correct the value read from the relative encoder 104 as position information of the zoom lens 102 when necessary is stored. The first CPU 103 is provided with a lens position output unit (serving as the output unit) 106 adapted to output the position information of the zoom lens 102 to the outside.

The second CPU 151 in the camera apparatus 150 is provided with a display unit 152, which is adapted to display the position information of the zoom lens 102 received through the communication line 140 connected to the first CPU 103 in the lens apparatus 101. The relative encoder 104 may be replaced by an absolute encoder. The use of an absolute encoder eliminates initialization that is necessary with the relative encoder 104.

The lens apparatus 101 has a constant field-of-view change rate mode switch (hereinafter referred to as mode switch) 109. When the mode switch 109 is off, the first CPU (serving as the deriving unit) 103 controls the zoom lens 102 in a normal manner. When the mode switch 109 is on, the first CPU 103 controls the driving of the zoom lens 102 in such a way that the field-of-view change rate is kept constant when a command value with a constant zoom lens position change speed (constant speed) is input.

The field of view represents the extent of the image pickup range or the length corresponding to the image size in a plane at an object distance conjugate with the image plane. The field-of-view change rate is the amount of change of the field-of-view per unit time in the case where a driven object is driven by the drive unit at a constant speed for zooming operation.

In the context of this specification, the zoom lens position (or zoom position) does not necessarily mean a physical position in the optical axis direction of the zoom lens. For example, the zoom lens position may be a value representing a displacement position of a cam member in cases where a cam mechanism is used for zoom driving. Alternatively, the zoom lens position may be a value representing a rotational angle of the cylindrical cam in cases where a cylindrical cam is used for zoom driving. The position of any component in the magnification variator made up of a movable lens for zooming, a drive mechanism including a cam for driving the movable lens, and other parts may serve as the zoom lens position described in the illustrative embodiment on condition that the position of that component (the position of the magnification variator) uniquely corresponds to the position of the movable lens. The present invention can be applied in such cases. Then, the change of the field of view relative to time in driving that component at a constant drive speed may be regarded as the field-of-view change rate defined in the present invention.

The field-of-view change rate of the lens apparatus 101 will be described with reference to FIG. 2.

With improvement in the performance and reduction in size and weight, there are lenses of which the change of the field-of-view change rate with zooming is not simple. In FIG. 2, the curve 201 represents the field-of-view change rate with zooming in an exemplary case. The field-of-view change rate is defined as the change of the field of view per unit change of the zoom position. In this exemplary case, there are two external values of the field-of-view change rate in the zoom range from the wide angle end to the telephoto end. In the case of zoom lenses of which the field-of-view change rate changes in a complex manner, if the zoom lens 102 is driven in such a way that the zoom position changes at a constant speed for zooming, there may arise a problem that the change of the image displayed on the monitor does not agree with the change expected from the operation made by the operator, because the field-of-view change rate is not constant. For example, even when zooming operation is performed with an intention to change the field of view at a constant speed by a constant speed command from the camera apparatus 150 or by pressing a seesaw switch (speed command unit 110) for inputting the zoom speed constantly, the field of view does not change at constant speed actually, in the case where the field-of-view change rate is not constant but varies depending on the zoom position.

Now, a virtual output of the lens apparatus 101 will be described with reference to FIGS. 3A and 3B.

The lens apparatus 101 has a virtual output as an interface for outputting position information to be used for CG compositing or the like. The virtual information includes position information of the zoom lens 102 as well as position information of the focus lens and the iris. The position information is used in CG compositing performed in an image processing system. When the field of view is changed for example by zooming, the position information of the zoom lens 102 changes, and the size of the CG is changed according to the position information of the zoom lens output from the lens apparatus 101 in the compositing processing.

Figure 3A:
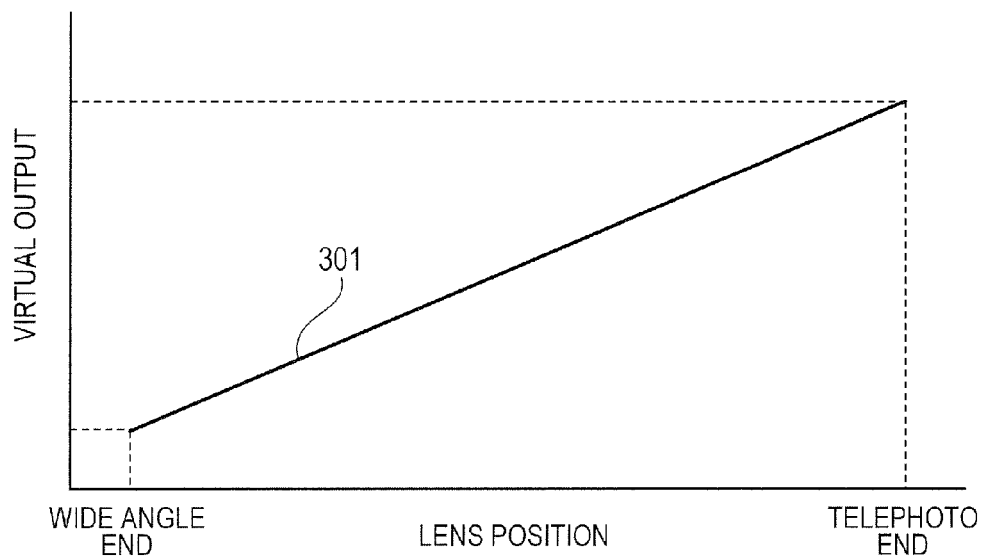
FIG. 3A is a graph showing virtual output.
Figure 3B:
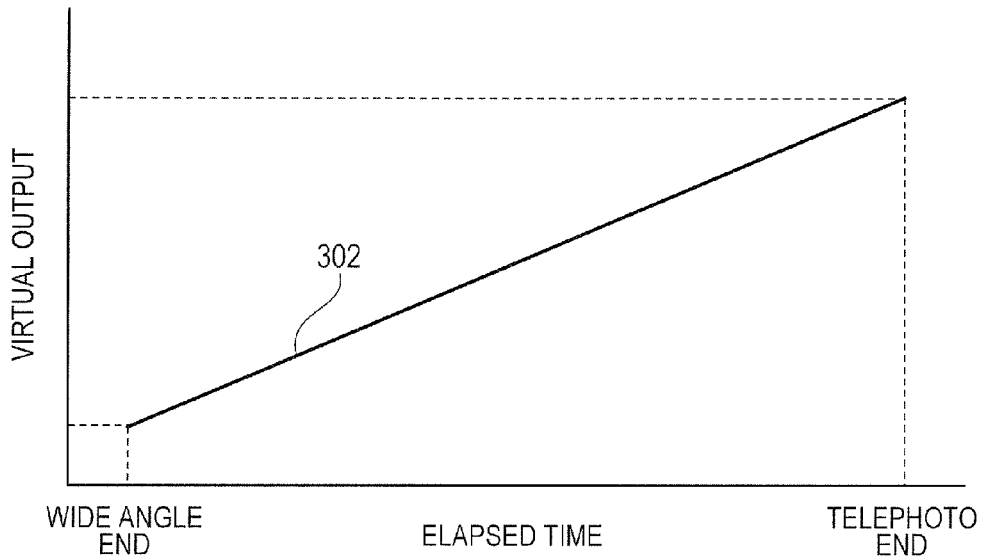
FIG. 3B is a graph showing virtual output.

The virtual output changes relative to the position of the zoom lens 102 in the manner shown by line 301 in FIG. 3A. Specifically, when the zoom lens 102 is driven from the wide angle end to the telephoto end of the zoom range at a constant speed, the virtual output of the lens 102 changes linearly from the wide angle end to the telephoto end as shown in FIG. 3B. Line 302 in FIG. 3B shows the change of the virtual output of the zoom lens 102 with time.

If it is assumed that the virtual output value is 0 at the wide angel end and 60000 at the telephoto end, the virtual output varies between 0 and 60000 with the shift of the zoom lens 102. This value is set independently from the focal length of the lens apparatus 101. Even if the lens apparatus 101 has other focal lengths at the wide angle end and the telephoto end, the virtual output value is set between 0 and 60000. For example, when the virtual output value is 10000, the corresponding focal length may be, for example, 100 mm in one case and 150 mm in another case, namely varies depending on the individual lens apparatuses 101. Thus, the virtual output value is a relative value representing a point between the wide angle end and the telephoto end of the focal length range corresponding to the position of the zoom lens 102.

The first CPU 103 in the lens apparatus 101 sends a value equivalent to the virtual output (which is typically a value of lower resolution than the virtual output) to the second CPU 151 in the camera apparatus 150 so that the camera apparatus 150 displays information indicating the position of the zoom lens 102 on the display unit 152. The photographer (operator) can know the position of the zoom lens 102 from the displayed position information of the zoom lens 102. This value is displayed in the viewfinder (not shown) of the camera apparatus 150.

The virtual output may be any type of signal that is determined uniquely in the range from the wide angle end to the telephoto end. For example, the virtual output may be a digital signal transmitted by serial communication, an analogue signal in a voltage range representing the focal length range from the wide angle end to the telephoto end, or an up-down signal using two-phase pulses.

In the following a case in which the first CPU 103 controls the zoom lens 102 at a constant field-of-view change rate with reference to FIG. 4.

Figure 2:
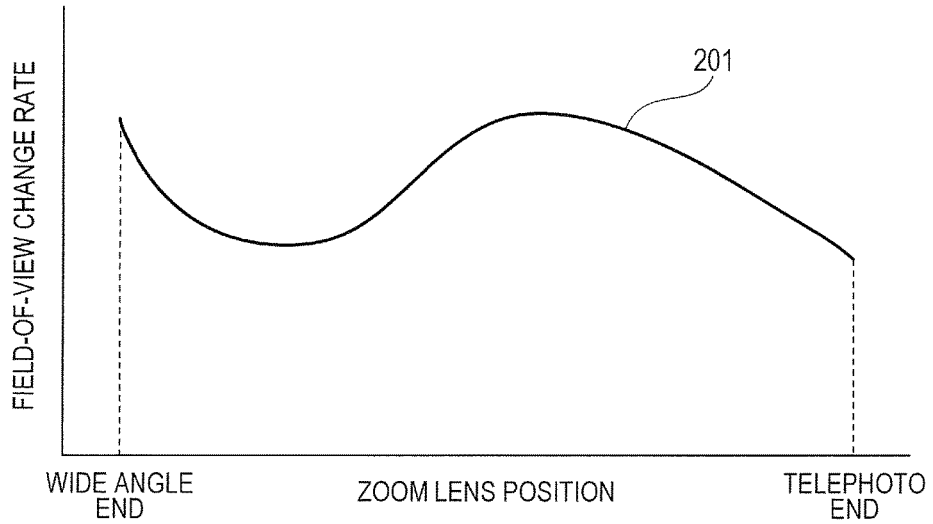
FIG. 2 is a graph showing the field-of-view change rate of the lens.

In the case described here, the field-of-view change rate varies with the change in the zoom lens position in the manner shown in FIG. 2. If the speed command value is constant, the zoom lens 102 is generally controlled to drive at a constant speed, which does not vary with the lapse of time, as shown by broken line 402 in FIG. 4. In other words, driving of the zoom lens 102 is controlled in such a way that a quantity corresponding to the position of the zoom lens 102 changes at a constant speed. In the case where a cylindrical cam mechanism is employed, the cylindrical cam is rotated at a constant rotation speed. The cylindrical cam is driven at a constant rotation speed, which does not vary with the lapse of time. In the case where driving of the zoom lens 102 is to be controlled in such a way that the field-of-view change rate is kept constant when the speed command is constant, the speed of the zoom lens 102 is controlled in the manner represented by curve 401 in FIG. 4. Specifically, the speed of the zoom lens 102 is made higher at focal lengths at which the field-of-view change rate is low and made lower at focal lengths at which the field-of-view change rate is high. In the case where the cylindrical cam mechanism is employed, the cylindrical cam is controlled in such a way that the rotation speed of the cylindrical cam is made higher at focal lengths at which the field-of-view change rate is low and made lower at focal lengths at which the field-of-view change rate is high. Thus, the first CPU 103 derives a speed command for driving the zoom lens with which the variation in the field-of-view change rate through the entire movable range of the magnification variator is smaller than that in the case where the zoom lens is driven at a constant speed. The first CPU 103 outputs the speed command as such to the control unit 107 to drive the zoom lens.

The position information of the zoom lens 102 used in control for making the field-of-view change rate constant is stored in the correction value memory 105. The position information is a value determined by design values such as optical characteristics and the shape of a zoom cam. The information stored in the correction value memory 105 may be, for example, relationship between the position of the zoom lens and the field-of-view change rate or relationship between the position of the zoom lens and the ratio of the field-of-view change rate to a predetermined reference value. When controlling the zoom lens 102, the value of the relative encoder 104 is corrected by the value stored in the correction value memory 105. The position correction value may be stored for every value of the relative encoder 104 (in accordance with its resolution) which constitutes the lens position information that is generated when the zoom lens 102 shifts from the wide angle end to the telephoto end. Alternatively, the number of the correction values stored may be decreased in order to reduce the data amount stored in the memory, and the dropped correction values may be calculated by, for example, linear approximation.

The position correction values may be values corresponding to data for virtual output instead of values corresponding to the values output from the relative encoder 104. In this case, the value output from the relative encoder 104 is converted into data for virtual output. In the normal mode, the value after conversion is used as the virtual output value. In the constant field-of-view change rate mode, the position correction value is applied to the virtual output value, and the value after the correction is output as the virtual output.

In the following, the virtual output in the case where the field-of-view change rate is kept constant will be described with reference to FIG. 5.

Figure 4:
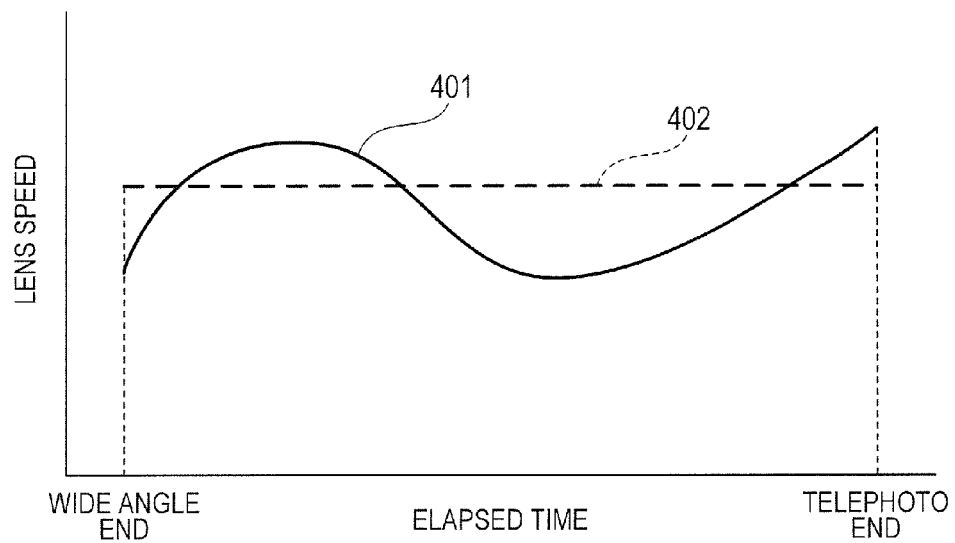
FIG. 4 is a graph showing the variation of the lens speed when the field-of-view change rate is controlled to be constant.
Figure 5:
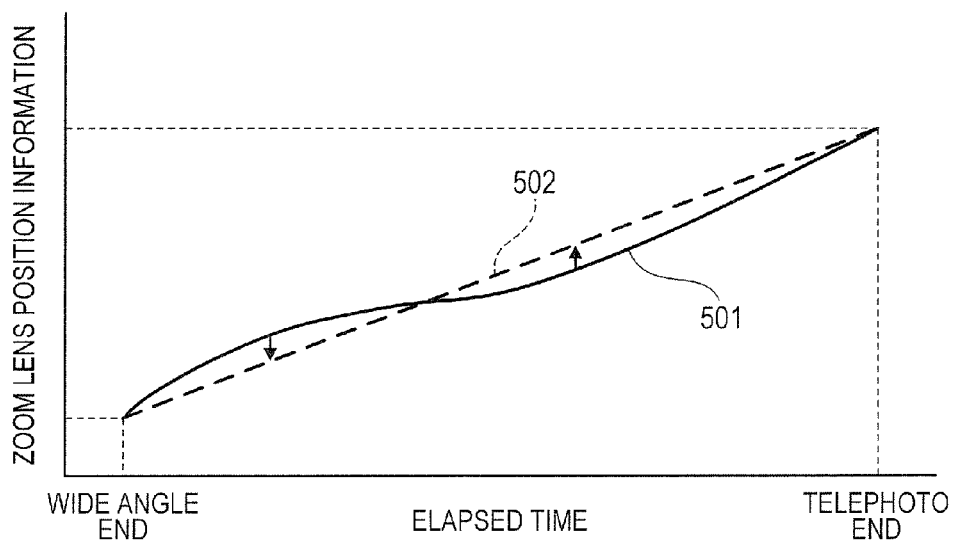
FIG. 5 is a graph showing virtual output after correction of lens position information when the field-of-view change rate is controlled to keep constant.

In the case where the zoom lens 102 is controlled in such a way that the field-of-view change rate is kept constant when the speed command is constant, the lens speed changes in the manner represented by curve 401 in FIG. 4, and the value (lens position information) output from the relative encoder 104 of the lens apparatus 101 changes in the manner represented by curve 501 in FIG. 5. The lens apparatus 101 obtains information about the field of view (position information and speed information) of the zoom lens on the basis of the information from the relative encoder 104. The lens position information (curve 501) is converted into data represented by straight line 502 in FIG. 5 by correction using the values stored in the correction value memory 105. The value after correction is output as the virtual output from the lens position output unit 106. The first CPU 103 in the lens apparatus 101 sends information data about the position of the zoom lens 102 for display, which has a resolution lower than the virtual output, to the second CPU 151 in the camera apparatus 150 through the communication line 140. The second CPU 151 in the camera apparatus 150 displays the received data for display on the display unit 152 of the camera apparatus 150.

Figure 6:
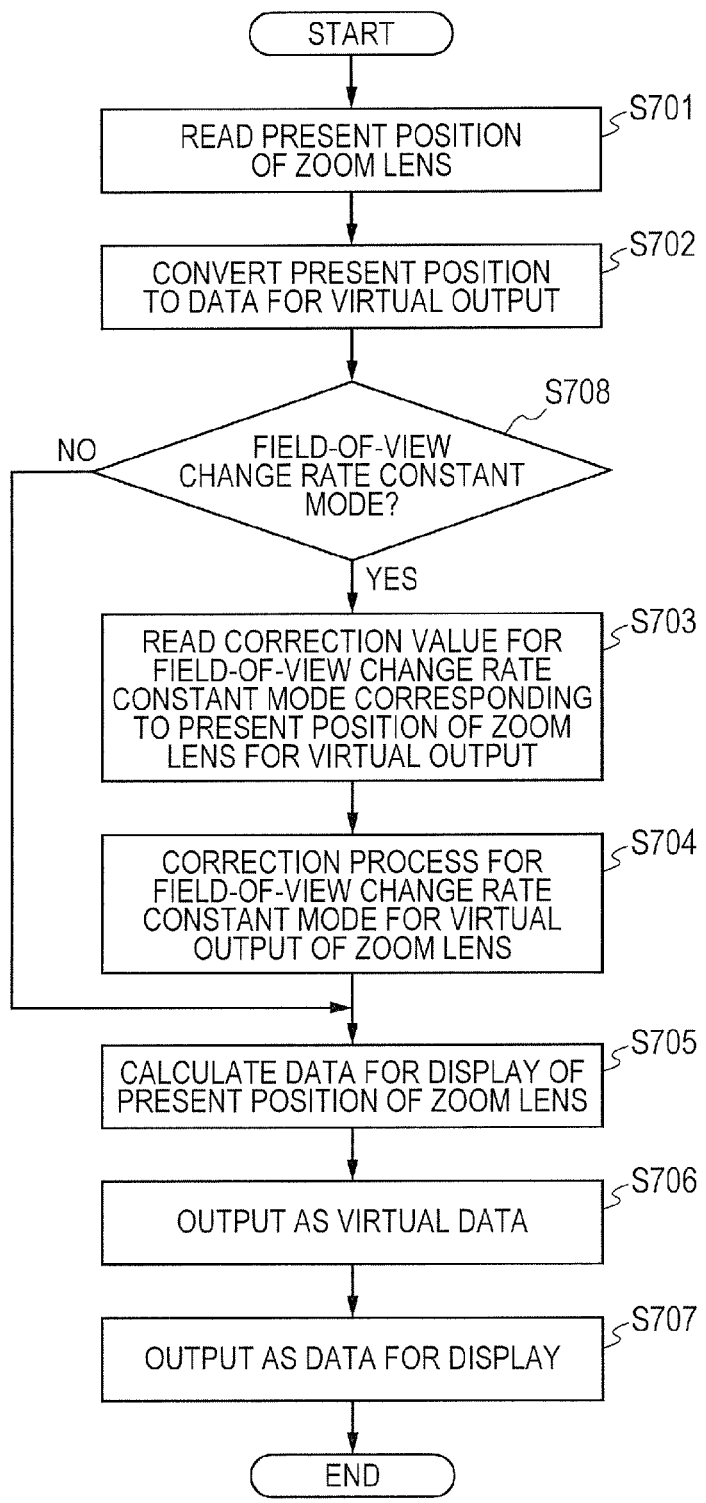
FIG. 6 is a flow chart of a process of virtual output correction performed when the field-of-view change rate is controlled to keep constant.

In the following, the flow of correction in the case where the field-of-view change rate is kept constant will be described with reference to FIG. 6.

In step S701, the current position CurrPos of the zoom lens 102 is read from the relative encoder 104. Then, the process proceeds to step S702.

In step S702, the current position CurrPos of the zoom lens 102 thus obtained is converted into data for virtual output VirtPos using the following equation (1):

$$VirtPos = Kv \times CurrPos \tag{1}$$

where Kv is a proportionality factor.

The conversion in step S702 is performed for cases where the data for virtual output VirtPos and the zoom lens current position CurrPos do not have the same value. For example, even in the case where it is arranged that the virtual output value changes in the range between 0 and 60000, the value of the current position CurrPos of the zoom lens 102 may vary among different lens apparatuses 101. In other words, the range of the value output from the relative encoder 104 may be different between a lens apparatus 101 in which the movable range of the zoom lens 102 is large and another lens apparatus 101 in which the movable range of the zoom lens 102 is small. After step S702, the process proceeds to step S708.

In step S708, it is determined that whether the constant field-of-view change rate mode is set. If the mode set is the normal mode, the process proceeds to step S705. If the mode set is the constant field-of-view change rate mode, the process proceeds to step S703.

In step S703, a correction value for the constant field-of-view change rate mode corresponding to the current value of the data for virtual output VirtPos of the zoom lens 102 is read from the correction value memory 105. Then, the process proceeds to step S704.

In step S704, the current position VirtConstPos in the constant field-of-view change rate mode is calculated from the current position CurrPos of the zoom lens 102 and the correction value CorrVal for the constant field-of-view change rate mode using the following equation (2):

$$VirtConstPos = CurrPos + CorrVal \tag{2}$$

The current position VirtConstPos in the constant field-of-view change rate mode thus calculated is set as data for virtual output VirtPos as per the following equation (3):

$$VirtPos = VirtConstPos \tag{3}$$

In step S705, data DispPos for display of the present position of the zoom lens 102 in the camera apparatus 150 is calculated from the data for virtual output VirtPos by the following equation (4):

$$DispPos = Kd \times VirtPos \tag{4}$$

where Kd is a proportionality constant. This process is performed for cases where the range of the data for virtual output VirtPos and the range of the data for display of the current position DispPos are different. Then, the process proceeds to step S706.

In step S706, the first CPU 103 outputs the data for virtual output VirtPos as virtual data to the outside through the lens position output unit 106. Then, the process proceeds to step S707.

In step S707, the first CPU 103 outputs the data for display of the current position DisPos of the zoom lens 102 as data for displaying the position of the zoom lens 102 in the camera apparatus 150 to the second CPU in the camera apparatus 150 through the communication line 140. The second CPU 151 displays the position information of the zoom lens 102 in the display unit 152. The first CPU 103 determines the position of the zoom lens 102 driven based on the derived speed command by the relative encoder 104 and outputs data for display of the current position DispPos of which the variation of the change rate is smaller than the variation of the change rate of the determined position, based on the relationship between the position and the field of view stored in the correction value memory 105 and the determined position. Preferably, the first CPU 103 outputs data for display of the current position DisPos of which the change rate is constant when constant speed command is input.

If the field-of-view change rate is kept constant when the speed command for the zoom lens 102 is constant as described above, the virtual output of the zoom lens 102 and the displayed position information change linearly. Therefore, the photographer (operator) does not feel disagreement of the change of the position information of the zoom lens 102 with the change expected from the operation he/she does. Since the zooming operation done by the photographer and the change of the virtual output value or the displayed value of position of the zoom lens 102 are in agreement, the operator can prevented from mistakenly thinking that he or she is operating the zoom lens in a wrong manner.

Figure 7A:
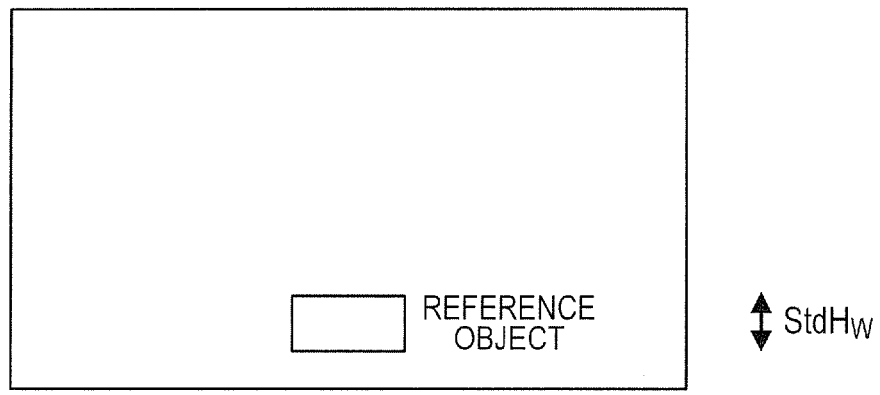
FIG. 7A is a diagram schematically showing measurement of the size of a reference object at the wide angle end when the field-of-view change rate is controlled to keep constant.
Figure 7B:
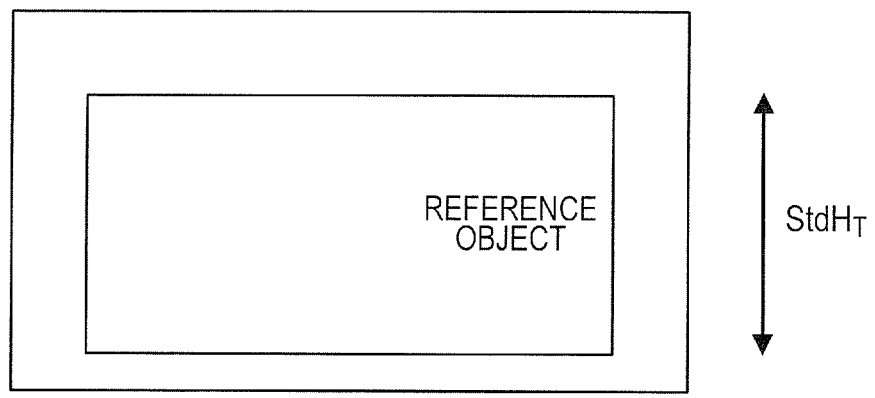
FIG. 7B is a diagram schematically showing measurement of the size of a reference object at the telephoto end when the field-of-view change rate is controlled to keep constant.

Now, we will describe a method of calculating the object magnification for CG compositing at each position of the zoom lens 102 in the case where the virtual output (or the output of the zoom position) is corrected to be linear when the zoom lens is controlled in such a way that the field-of-view change rate is kept constant during zooming with reference to FIGS. 7A and 7B.

The nominal value of the magnification of the lens and the lens position information at the wide angle end and the telephoto end of the zoom lens 102 in the lens apparatus 101 vary due to manufacturing errors and flange-back adjustment. Therefore, is necessary to perform calibration (or actual measurement) of the vertical height of a reference object at the wide angle end and the telephoto end.

The magnification M is represented by the following equation (5):

$$M = StdH_W/StdH_T \tag{5}$$

where $StdH_W$ is the vertical height of the reference object at the wide angle end, and $StdH_T$ is the vertical height of the reference object at the telephoto end.

The field-of-view change rate A is expressed by the following equation (6):

$$A = M^{1/n} = (StdH_W/StdH_T)^{1/n} \tag{6}$$

where n is the resolution of the virtual output.

From the above, the magnification P(X) of the vertical height for a virtual output value X (0 to n) is expressed as follows:

$$P(X) = (StdH_W/StdH_T)^{X/n} \tag{7}$$

Therefore, if the vertical height of the object at the wide angle end is $H_W$, the vertical height H(X) of the object at a virtual output value X is expressed as follows:

$$H(X) = H_W \times (StdH_W/StdH_T)^{X/n} \tag{8}$$

Thus, it is only necessary to measure the size of the reference object at the wide angle end and the telephoto end, and it is not necessary to measure it at intermediate focal lengths, while the size of the reference object is measured at every focal length needed in the case of prior arts. In consequence, the time efficiency in preparation for image shooting can be improved greatly.

While driving control of the zoom lens has been described in the foregoing, the above processing can be applied to manual operation also to output corrected position information in the same manner. Then, a difference in the position information between servo control and manual control can be eliminated, and the lens apparatus can output unified zoom lens position information to an external apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081284, filed Apr. 10, 2015, which is hereby incorporated by reference herein in its entirety.

What is claimed is:

1. A lens apparatus comprising:
    a magnification variator configured to move during magnification varying;
    a drive unit configured to drive the magnification variator;
    a detector configured to detect a position of the magnification variator;
    a deriving unit configured to derive a second drive signal to drive the drive unit based on: an information representing a relationship between a position of the magnification variator and a size of a field of view picked up through the lens apparatus; a position detected by the detector; and a first drive signal, wherein a field-of-view change rate obtained when the drive unit is driven based on the second drive signal is smaller than a field-of-view change rate obtained when the drive unit is driven based on the first drive signal; and
    a corrector configured to output position data in which a variation of speed of the magnification variator is smaller than that of position data based on the second drive signal, when the magnification variator is driven based on the second drive signal derived by the deriving unit.

2. A lens apparatus according to claim 1, wherein the deriving unit derives the second drive signal that makes the variation of the field-of-view change rate smaller than that in the case where the magnification variator is driven at a constant speed.

3. A lens apparatus according to claim 1, wherein the corrector corrects the position data based on the relationship between the position and the field of view stored in a memory in such a way that the rate of change of the position detected by the detector with time is kept constant when a constant drive command is input for the position and outputs the corrected position data.

4. A lens apparatus according to claim 1, wherein the corrector outputs the position data as two phase pulses.

5. A lens apparatus according to claim 1, wherein the corrector outputs the position data as a digital signal in serial communication.

6. A lens apparatus according to claim 1, wherein the corrector outputs the position data as an analog signal.

7. A lens apparatus according to claim 1, further comprising an output unit configured to output the position of the magnification variator to the outside, the output unit outputting the position data.

8. A lens apparatus according to claim 1, wherein the drive unit is configured to drive the magnification variator, based on the second drive signal.

9. An image pickup apparatus comprising a lens apparatus and an image pickup element that picks up an image formed by the lens apparatus, the lens apparatus comprising:
    a magnification variator configured to move during magnification varying;
    a drive unit configured to drive the magnification variator;
    a detector configured to detect a position of the magnification variator;
    a deriving unit configured to derive a second drive signal to drive the drive unit based on: an information representing a relationship between a position of the magnification variator and a size of a field of view picked up through the lens apparatus; a position detected by the detector; and a first drive signal, wherein a field-of-view change rate obtained when the drive unit is driven based on the second drive signal is smaller than a field-of-view change rate obtained when the drive unit is driven based on the first drive signal; and
    a corrector configured to output position data in which a variation of speed of the magnification variator is smaller than a variation of speed based on position data when the magnification variator is driven based on the second drive signal.

* * * * *